(12) United States Patent
Ogawa et al.

(10) Patent No.: US 9,979,003 B2
(45) Date of Patent: May 22, 2018

(54) BUS BAR INCLUDING TWO CONDUCTIVE CONCAVE PORTIONS AND BATTERY MODULE

(71) Applicant: KABUSHIKI KAISHA TOSHIBA, Minato-ku (JP)

(72) Inventors: Takaya Ogawa, Kawasaki (JP); Masato Iwata, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 149 days.

(21) Appl. No.: 14/803,676

(22) Filed: Jul. 20, 2015

(65) Prior Publication Data
US 2016/0344011 A1 Nov. 24, 2016

(30) Foreign Application Priority Data
May 21, 2015 (JP) .................... 2015-103590

(51) Int. Cl.
*H01M 2/24* (2006.01)
*H01M 2/20* (2006.01)
(Continued)

(52) U.S. Cl.
CPC ......... *H01M 2/202* (2013.01); *H01M 2/1077* (2013.01); *H01M 2/206* (2013.01); *H01M 2/347* (2013.01)

(58) Field of Classification Search
CPC .... H01M 2/1077; H01M 2/202; H01M 2/347; H01M 2/206
(Continued)

(56) References Cited

U.S. PATENT DOCUMENTS 1,382,129 A 6/1921 Shields
2009/0274956 A1 11/2009 Kosugi et al.
(Continued)

FOREIGN PATENT DOCUMENTS

DE 10 2012 100 862 A1 8/2013
EP 2 757 611 A1 7/2014
(Continued)

OTHER PUBLICATIONS

Office Action dated Feb. 16, 2016 in Japanese Patent Application No. 2015-103590 (with English language translation).
(Continued)

*Primary Examiner* — Gary Harris
(74) *Attorney, Agent, or Firm* — Oblon, McClelland, Maier & Neustadt, L.L.P.

(57) ABSTRACT

According to one embodiment, a bus bar electrically connects terminals of a cathode and an anode of a battery module, the battery module being formed by coupling a plurality of battery cells each including the terminals of the cathode and the anode. The bus bar includes a first connection portion formed of an electrically conductive, substantially conical elastic body which abuts on the terminal of a first battery cell of the battery cells; a second connection portion formed of an electrically conductive, substantially conical elastic body which abuts on the terminal of a second battery cell which is different from the first battery cell; and an electrically conductive plate-shaped member in which the first and second connection portions are formed spaced apart in accordance with a distance between the terminals.

6 Claims, 4 Drawing Sheets

(51) Int. Cl.
*H01M 2/10* (2006.01)
*H01M 2/34* (2006.01)

(58) Field of Classification Search
USPC .......................................................... 429/158
See application file for complete search history.

(56) References Cited

U.S. PATENT DOCUMENTS

| | | |
|---|---|---|
| 2010/0116570 A1 | 5/2010 | Sugawara et al. |
| 2010/0248007 A1 | 9/2010 | Kwon et al. |
| 2011/0177381 A1* | 7/2011 | Oya ................ H01M 2/202 |
| | | 429/158 |
| 2012/0231320 A1 | 9/2012 | Heck et al. |
| 2012/0288744 A1 | 11/2012 | Guen |
| 2013/0029540 A1 | 1/2013 | Tong et al. |
| 2013/0082659 A1 | 4/2013 | Kano |
| 2013/0252075 A1 | 9/2013 | Shimizu et al. |
| 2013/0344378 A1* | 12/2013 | Kohara ............... H01M 2/1016 |
| | | 429/158 |
| 2014/0205889 A1 | 7/2014 | Kim et al. |
| 2016/0013466 A1 | 1/2016 | Kwon et al. |

FOREIGN PATENT DOCUMENTS

| | | |
|---|---|---|
| GB | 252844 A | 6/1926 |
| JP | 54-161512 U | 4/1978 |
| JP | 11-317216 A | 11/1999 |
| JP | 2007-194035 A | 8/2007 |
| JP | 2009-087761 | 4/2009 |
| JP | 2010-113999 A | 5/2010 |
| JP | 2011-233491 A | 11/2011 |
| JP | 2011-233492 A | 11/2011 |
| JP | 2012-28050 A | 2/2012 |
| JP | 2012-238562 A | 12/2012 |
| JP | 2012-252811 A | 12/2012 |
| JP | 2013-73864 A | 4/2013 |
| JP | 2013-197017 | 9/2013 |
| JP | 2014-146599 A | 8/2014 |
| JP | 2015-41610 A | 3/2015 |
| JP | 2015-49930 A | 3/2015 |
| WO | WO 2007/083697 A1 | 7/2007 |
| WO | WO 2011/038908 A1 | 4/2011 |

OTHER PUBLICATIONS

"Fifth Edition of the Physics and Chemistry Dictionary" Iwanami, 1998, p. 816 and Cover Page.
Extended European Search Report dated Mar. 21, 2016 in Patent Application No. 15178595.3.
Extended European Search Report dated Oct. 28, 2016 in Patent Application No. 15202389.1.

* cited by examiner

BUS BAR INCLUDING TWO CONDUCTIVE CONCAVE PORTIONS AND BATTERY MODULE

CROSS-REFERENCE TO RELATED APPLICATION

This application is based upon and claims the benefit of priority from Japanese Patent Application No. 2015-103590, filed May 21, 2015, the entire contents of which are incorporated herein by reference.

FIELD

Embodiments described herein relate generally to a bus bar which electrically connects terminals of cells, and a battery module.

BACKGROUND

A bus bar electrically connects, for example, terminals of electrodes of a battery module of a secondary battery.

A bus bar that connects terminals of electrodes, through which a large current flows, needs to have a predetermined thickness in order to decrease electrical resistance. On the other hand, the bus bar needs to have flexibility for maintaining the precision in position relative to the terminals to which the bus bar is connected, thereby to adapt to distortion due to a shock or heat from the outside, and swelling of the cells.

A generally used bus bar is configured such that two connection portions are provided on a plate member having such a plate thickness as to be able to suppress electrical resistance, and an arcuate spring-like portion is provided between the two termination connection portions. Thereby, the generally used bus bar keeps electrical resistance low, and has a certain degree of flexibility.

The above-described bus bar can absorb, by deformation of the arcuate spring-like portion, a shock in one direction connecting the two connection portions. However, the above bus bar has low flexibility against a shock in other directions. In addition, in the above bus bar, by reducing the plate thickness, the flexibility can be improved but, conversely, it becomes difficult to keep electrical resistance low.

The object of the embodiments is to provide a bus bar which keeps electric resistance low (i.e. have low resistance) and has a sufficient flexibility, and a battery module.

DETAILED DESCRIPTION

Figure 1:
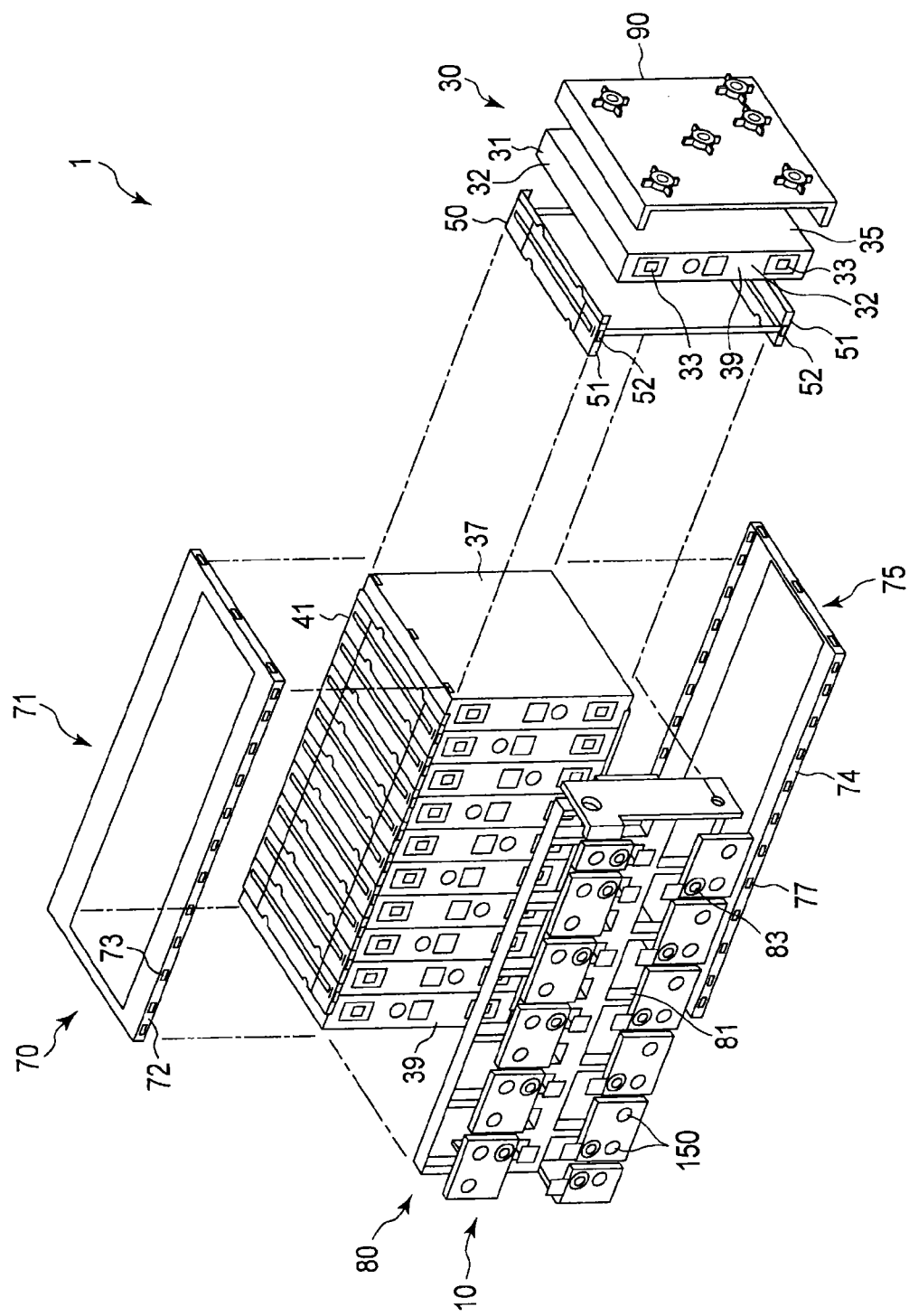
FIG. 1 is an exploded perspective view of a battery module according to an embodiment.

In general, according to one embodiment, a bus bar electrically connects terminals of a cathode and an anode of a battery module, the battery module being formed by coupling a plurality of battery cells each including the terminals of the cathode and the anode. The bus bar includes a first connection portion formed of an electrically conductive, substantially conical elastic body which abuts on the terminal of a first battery cell of the battery cells; a second connection portion formed of an electrically conductive, substantially conical elastic body which abuts on the terminal of a second battery cell which is different from the first battery cell; and an electrically conductive plate-shaped member in which the first and second connection portions are formed spaced apart in accordance with a distance between the terminals.

First Embodiment

Hereinafter, a bus bar 10 according to a first embodiment will be described with reference to the accompanying drawings.

To begin with, a battery module 1, to which the bus bar 10 is attached, is described with reference to FIG. 1.

The battery module 1 includes a plurality of cells 30, separators 50 disposed between neighboring cells 30, a bus bar 10 which electrically connects the plural cells 30, and a housing 70 which surrounds and fixes the cells 30 as one unit.

The cell 30 includes a rectangular box-shaped casing 31. The casing 31 includes a first surface 35 and a second surface 37 which are substantially square and are disposed to be opposed to each other. In addition, the casing 31 includes four side surfaces 32 between the first surface 35 and second surface 37.

Terminals 33 of two electrodes are provided on a terminal surface 39 which is one of the four side surfaces 32. One of the terminals is a cathode, and the other is an anode. A cell material is filled in the inside of the casing 31, thus realizing a function as a cell. For example, the cell 30 is a secondary battery.

In the embodiment, the cells 30 are disposed such that the terminal surfaces 39, on which the terminals 33 are provided, are put in order, and that the terminals 33 of the cathodes and anodes of neighboring cells 30 are alternately arranged. In other words, the cells 30 are disposed such that, in the state in which the terminal surfaces 39 are put in order, neighboring cells 30 are inverted over 180 degrees relative to each other and laid over each other, with the first surfaces 35 or second surfaces 37 of the neighboring cells 30 being opposed to each other.

The separator 50 is an insulative, rectangular frame which is disposed between two neighboring cells 30.

As illustrated in FIG. 1, the separator 50 is a frame body having, on both surfaces thereof, quadrangular inner peripheries which are slightly larger than the first surface 35 of the cell 30. The separator 50 fits and fixes thereto the cells 30 which neighbor on both sides of the separator 50. As the material of the separator 50, for example, an insulative resin material is used.

The housing 70 is a frame body which is disposed in a manner to surround the plural cells 30 and plural separators 50. Specifically, in the embodiment, the housing 70 includes an upper-surface frame 71, a lower-surface frame 75, a terminal-surface frame 80, and an end-face cover 90. The housing 70 surrounds a juxtaposed-structure body of eleven cells 30 and ten separators 50 fitted therebetween, and fixes the cells 30. In the embodiment, the housing 70 was fabricated by using a metallic material. Incidentally, the material of the housing 70, if having a necessary strength, is not limited to a metal, and may be a resin, etc.

The upper-surface frame 71 is a quadrangular frame body having a greater outer periphery than an upper surface 41 of the juxtaposed cells 30. In addition, the upper-surface frame 71 includes a plurality of holes 73 which are arranged and provided in a side surface 72 thereof. The holes 73 engage projections 52 provided on corner portions 51 of the separators 50, thereby fixing the upper-surface frame 71 to the upper surface 41.

Similarly, the lower-surface frame 75 includes a quadrangular frame body having a slightly greater outer periphery than a lower surface of the juxtaposed cells 30. In addition, the lower-surface frame 75 includes a plurality of holes 77 which are arranged and provided in a side surface 74 thereof. The holes 77 engage projections 52 provided on corner portions 51 of the separators 50, and the lower-surface frame 75 is fixed.

Specifically, the juxtaposed cells 30 are clamped and fixed in the up-and-down direction with the use of the upper-surface frame 71 and lower-surface frame 75.

In addition, the terminal-surface frame 80 is a frame body which is disposed to be opposed to the terminal surfaces 39 of the cells 30. The terminal-surface frame 80 includes hole portions 81 which form a plurality of quadrangular holes. The bus bar 10 is fixed to each of the hole portions 81.

As illustrated in FIG. 1, the bus bar 10 is a plate-shaped member which electrically connects neighboring terminals 33 (e.g. cathode and anode) of neighboring cells 30. Specifically, the bus bar 10 functions as a part of an electric circuit for connecting the cells 30. In the meantime, the bus bar 10 is disposed in the hole portion 81 of the terminal-surface frame 80, is fixed to the terminals 33, and is screwed to the terminal-surface frame 80 by using a screw 83.

Figure 2:
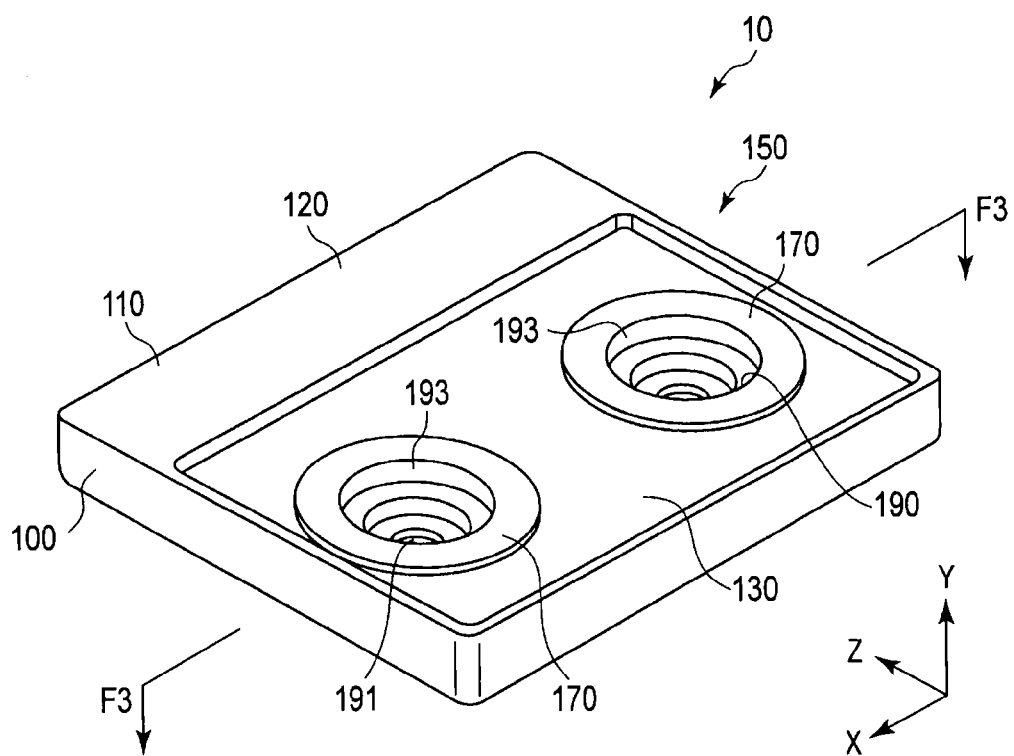
FIG. 2 is a perspective view illustrating a bus bar which is used in the battery module of FIG. 1.
Figure 3:
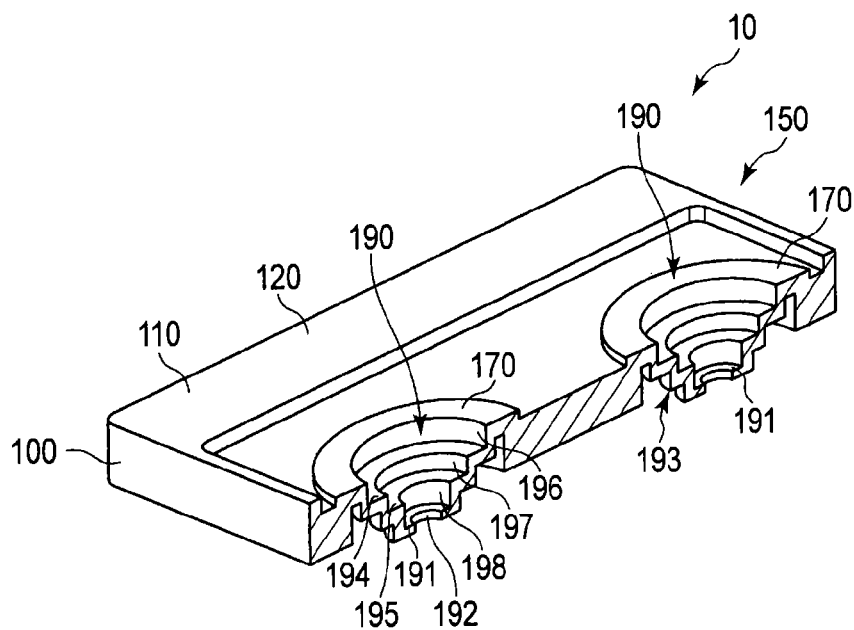
FIG. 3 is a cross-sectional view illustrating a state in which the bus bar of FIG. 2 is cut along a line F3-F3 in FIG. 2.

The bus bar 10 has a concrete structure as illustrated in FIG. 2 and FIG. 3. FIG. 2 is a perspective view of the bus bar 10 according to the first embodiment, and FIG. 3 is a cross-sectional perspective view illustrating the bus bar 10 of FIG. 2, which is cut along a line F3-F3 in FIG. 2.

The bus bar 10 is formed by processing a rectangular plate-shaped member 100 by, for example, press working, as illustrated in FIG. 2. Specifically, in the bus bar 10, a quadrangular region 130, which is stepped downward, is formed in a part of a surface 110 of the plate-shaped member 100. The bus bar 10 includes, in parts of this quadrangular region 130, a first connection portion and a second connection portion each formed of a substantially conical elastic body 150 (hereinafter, each of the first and second connection portions is simply referred to as "elastic body 150").

In the meantime, in the embodiment, the plate-shaped member 100 and elastic bodies 150 are integrally formed of an electrically conductive material. In addition, in the embodiment, although the bus bar 10 is described as being integrally formed by press working, the forming method of the bus bar 10 is not limited to this. For example, the bus bar 10 can be formed such that the plate-shaped member 100 and elastic bodies 150 are separately formed, and are coupled by welding.

Besides, in the embodiment, although the two elastic bodies 150 are disposed in the longitudinal direction of the region 130, the disposition of the two elastic bodies 150 in the plate-shaped member 100 is not limited to this disposition. Specifically, the two elastic bodies 150 are formed and disposed in accordance with the distance between the terminals 33 of the two cells 30 to which the bus bar 10 is attached, and the positions where the terminals 33 are provided.

As illustrated in FIG. 2 and FIG. 3, the elastic body 150 includes a convex portion 170 and a concave portion 190.

The convex portion 170 is an annular projecting portion provided on the region 130. The concave portion 190 is a recessed portion provided on the inner peripheral side of the convex portion 170.

The concave portion 190 is a substantially conical recessed portion including a bottom portion 191 and a peripheral wall 193. Specifically, the peripheral wall 193 includes three stepped portions with different diameters (first stepped portion 194, second stepped portion 195, bottom portion 191). A first peripheral wall 196 is formed between the convex portion 170 and first stepped portion 194. A second peripheral wall 197 is formed between the first stepped portion 194 and second stepped portion 195. Further, a third peripheral wall 198 is formed between the second stepped portion 195 and bottom portion 191. The bottom portion 191 includes a hole portion 192 (FIG. 3) at a substantially central portion thereof.

In addition, as illustrated in FIG. 3, the concave portion 190 is formed to have a less plate thickness than the convex portion 170 therearound, and the region 130. Incidentally, the plate thickness of the concave portion 190 is not specifically limited. Here, as the plate thickness of the concave portion 190 becomes smaller, the flexibility increases and the electrical resistance also increases. On the other hand, if the plate thickness is made greater, the flexibility decreases and the electrical resistance also decreases. In short, the plate thickness of the concave portion 190 can properly be designed in consideration of the amount of electric current flowing in the bus bar 10 and the workability.

The first stepped portion 194 is an annular portion which has an outer periphery of the same diameter as the inner periphery of the annular convex portion 170, and is formed coaxial with the convex portion 170. The convex portion 170 and first stepped portion 194 are coupled by the first peripheral wall 196.

The second stepped portion 195 is an annular portion which has an outer periphery of the same diameter as the inner periphery of the annular first stepped portion 194, and is formed coaxial with the first stepped portion 194. The first stepped portion 194 and second stepped portion 195 are coupled by the second peripheral wall 197.

The bottom portion 191 is an annular portion which has an outer periphery of the same diameter as the inner periphery of the annular second stepped portion 195, and is formed coaxial with the second stepped portion 195. The second stepped portion 195 and bottom portion 191 are coupled by the third peripheral wall 198. The bottom portion 191 includes the hole portion 192 at the central portion thereof.

Figure 4:
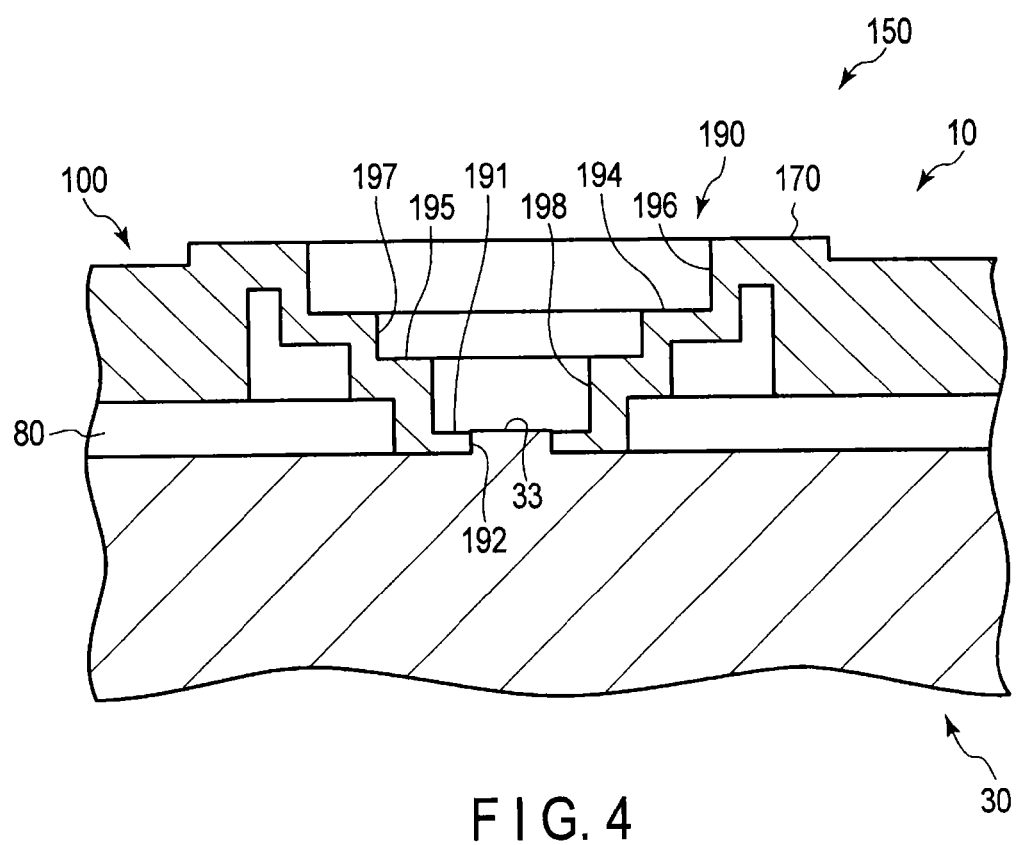
FIG. 4 is a partial explanatory view illustrating a state in which a terminal is attached to the bus bar of FIG. 2.

Next, referring to FIG. 1 and FIG. 4, a connection structure between the bus bar 10 and the terminal 33 of the cell 30 is described. FIG. 4 is an explanatory view illustrating a state in which the terminal 33 is attached to the bus bar 10 of FIG. 2.

As illustrated in FIG. 1, the bus bar 10 is disposed in the hole portion 81 of the terminal-surface frame 80. The bus bar 10 disposed in the terminal-surface frame 80 abuts on the terminal 33 of the cell 30, which is provided on the terminal surface 39.

Specifically, as illustrated in FIG. 4, the terminal 33 on the cell 30 side is fitted in the hole portion 192 in the bottom portion 191 of the elastic body 150 of the bus bar 10. Although not illustrated in FIG. 4, the terminal 33 fitted in the hole portion 192 is, in fact, fixed by using, for example, solder, in the state in which the terminal 33 abuts on the bottom portion 191.

The bus bar 10 with this structure is exactly fixed to the terminal 33. In addition, in the bus bar 10, for example, even in the case where a shock from the outside has been applied to the battery module 1, each of the elastic bodies 150 can adapt to the shock, elastically deform, and absorb the shock. Furthermore, since the elastic body 150 has a substantially conical shape, the elastic body 150 has a shock-absorbing function against a shock in either an X direction or a Z direction, as illustrated in FIG. 2. Moreover, since the elastic body 150 includes the concave portion 190 including the plural stepped portions, the elastic body 150 can also absorb a shock in a Y direction.

Specifically, the peripheral wall 193 of the concave portion 190, which is formed of the first stepped portion 194, second stepped portion 195, etc. can bend in accordance with external force, and can absorb a shock. Incidentally, in the embodiment, although the peripheral wall 193 is formed of the three stepped portions (first stepped portion 194, second stepped portion 195, bottom portion 191, first peripheral wall 196, second peripheral wall 197, third peripheral wall 198), the number of steps of the peripheral wall 193 is not specifically limited. The number of steps is properly determined in accordance with the material used for the bus bar 10, the environment of use, the cost for working, etc.

Additionally, in the bus bar 10 of the embodiment, unlike a conventional, general bus bar, the elastic bodies 150 are disposed at positions for connection to the terminals 33. Thus, shocks, which are applied to the battery module 1, can be individually absorbed by the elastic bodies 150 corresponding to the respective terminals 33.

Additionally, the elastic body 150 of the embodiment includes the annular convex portion 170 around the concave portion 190. Thus, for example, even in the case where a large current of 100 amperes to several-hundred amperes is supplied over several-ten seconds, the heat produced by a high electric resistance of the concave portion 190, which is formed with a small plate thickness, can be absorbed by the convex portion 170 which is formed to have such a thickness as to secure a peripheral heat capacity. Therefore, the bus bar 10 can prevent a sharp temperature rise of the elastic body 150.

Furthermore, the bus bar 10 of the embodiment includes a stepped portion 120 in the vicinity of the region 130. Thus, the heat produced by the supply of a large electric current can be absorbed by the stepped portion 120, in addition to the convex portion 170.

Additionally, the stepped portion 120 enhances the rigidity of the bus bar 10, and prevents the bus bar 10 from deforming due to a shock, etc. applied to the battery module 1.

Additionally, in the above-described general bus bar, at a time of assembly, there is a concern that a gap occurs between the two terminals and the two connection portions due to a stress of the arcuate spring-like portion. Skill is needed for a work of welding the terminals and the connection portions, while eliminating this gap.

By contrast, the bus bar 10 of the embodiment is configured such that the two elastic bodies 150 are provided in the inside of the plate-shaped member 100. Thereby, no such gap as described above occurs between the terminal 33 and the elastic body 150. Specifically, an assembly work for the bus bar 10 of the embodiment is easy. Moreover, also in the welding work, such a configuration is adopted that the terminal 33 is welded to the bottom portion 191 of the concave portion 190. Therefore, the precision in position of welding can be enhanced.

Figure 5:
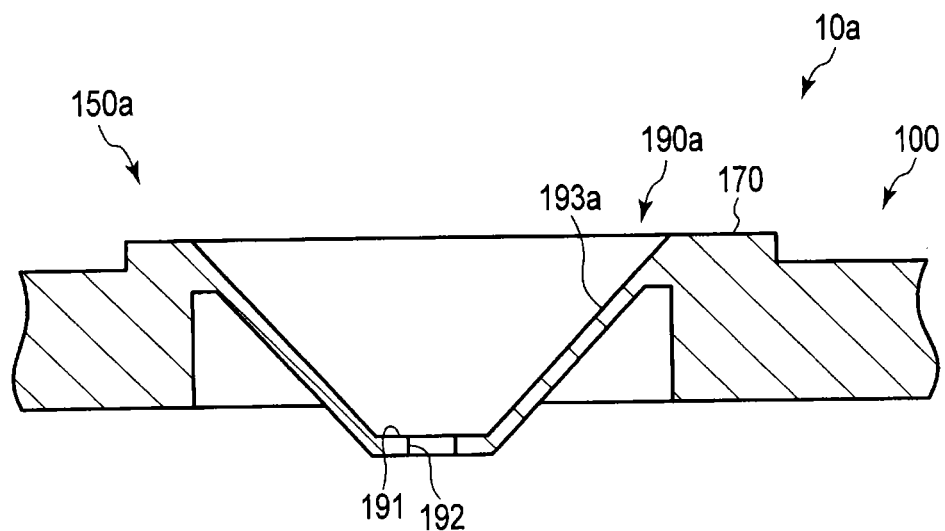
FIG. 5 is a cross-sectional view of a main part of a bus bar according to a second embodiment.

Specifically, in the bus bar 10 in the embodiment, as illustrated in FIG. 4, after each terminal 33 is engaged in the hole portion 192 of the bottom portion 191 of the corresponding elastic body 150, the terminal 33 and the hole portion 192 can be welded and fixed. In addition, the elastic body 150 is provided in association with each terminal 33. Thus, in the bus bar 10, such a situation does not occur that, while one elastic body 150 is held, the other elastic body 150 is lifted and a gap occurs. Thus, since the bus bar 10 is configured such that the terminal 33 is welded at the bottom portion 191 of the concave portion 190, a positional displacement in welding hardly occurs in the welding work. In short, the bus bar 10 can easily be welded to the terminal 33 with high precision in position Second Embodiment Next, a bus bar 10a according to a second embodiment, which is illustrated in FIG. 5, is described. Incidentally, those members of the bus bar 10a of the second embodiment, which are the same as in the bus bar 10 of the first embodiment, are denoted by like reference numerals, and a detailed description thereof is omitted.

FIG. 5 is a cross-sectional view of the bus bar 10a according to the second embodiment.

The difference between the bus bar 10 according to the first embodiment and the bus bar 10a of the present embodiment is that a concave portion 190a of an elastic body 150a is formed of a peripheral wall 193a having a tapered shape.

The bus bar 10a with this structure is exactly fixed to the terminal 33. In addition, in the bus bar 10a, even in the case where external force has been applied to the battery module 1, the concave portion 190a of the elastic body 150a, which is formed in a tapered shape, can elastically deform, and absorb the shock.

Specifically, the peripheral wall 193a of the concave portion 190a can bend in accordance with the external force, and can absorb the shock.

Additionally, the bus bar 10a of the embodiment includes the annular convex portion 170 around the concave portion 190a. Thus, in the bus bar 10a, for example, even in the case where a large current of 100 amperes to several-hundred amperes is supplied over several-ten seconds, the heat that is produced can be absorbed by the convex portion 170.

Additionally, like the bus bar 10 of the first embodiment illustrated in FIG. 2, the bus bar 10a of the present embodiment includes a stepped portion 120 with a different thickness in the vicinity of the region 130. Thereby, the bus bar 10a can absorb the produced heat by this stepped portion 120, too.

Additionally, the stepped portion 120 enhances the rigidity of the bus bar 10a, and prevents the bus bar 10a from deforming due to external force applied to the battery module 1.

Additionally, in the bus bar 10a in the present embodiment, after each terminal 33 is engaged in the hole portion 192 of the bottom portion 191 of the corresponding elastic body 150a, the terminal 33 and the hole portion 192 can be welded and fixed. In addition, the elastic body 150a is provided in association with each terminal 33. Thus, such a situation does not occur that, while one elastic body 150a is held, the other elastic body 150a is lifted and a gap occurs. Thus, since the bus bar 10a is configured such that the terminal 33 is welded at the bottom portion 191 of the concave portion 190a, a positional displacement in welding hardly occurs. In short, the bus bar 10a can easily be welded to the terminal 33 with high precision in position.

Additionally, since no stepped portion is provided on the peripheral wall 193, the bus bar 10a of the present embodiment can easily be formed by press working, etc.

Third Embodiment

Figure 6:
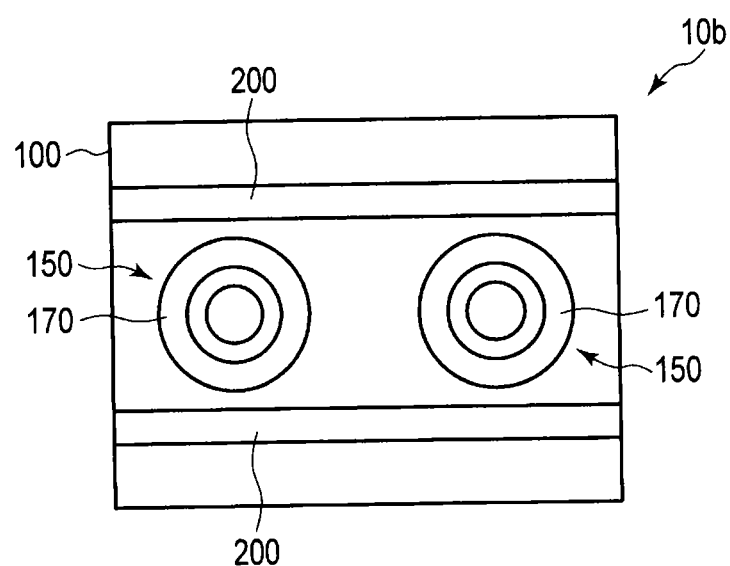
FIG. 6 is a plan view illustrating a bus bar according to a third embodiment.

Next, a bus bar 10b according to a third embodiment, which is illustrated in FIG. 6, is described. Incidentally, those members of the bus bar 10b of the third embodiment, which are the same as in the bus bar 10 of the first embodiment, are denoted by like reference numerals, and a detailed description thereof is omitted.

The difference between the bus bar 10 according to the first embodiment and the bus bar 10b of the present embodiment is that two convex strip portions 200 are formed, in place of the stepped portion 120, in the direction of disposition of the elastic bodies 150, with the elastic bodies 150 being interposed. Incidentally, in the present embodiment, although the convex strip portions are formed, the shape of these portions is not limited to this shape if the rigidity can be increased. For example, the convex strip portions may be, conversely, concave strip portions. In addition, the strip portion may be formed, not in the straight shape, but in a curved shape or a wavy shape.

The above-described bus bar 10b illustrated in the third embodiment has the same advantageous effects as with the bus bar 10 of the first embodiment.

Furthermore, by the provision of the two convex strip portions 200, the rigidity of the bus bar 10b of the third embodiment is increased. Besides, like the stepped portion 120 of the first embodiment, the convex strip portions 200 can absorb the heat that was produced.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

For example, the structure of the elastic body 150 of the bus bar 10 is not limited to the above-described structure. Specifically, the concave portion 190 can be formed of a so-called volute spring. By using the volute spring for the concave portion 190, the capability of absorbing a shock in the axial direction of the concave portion 190 can be further improved. Incidentally, the volute spring is a spring which is formed by winding a rectangular plate in a conical shape.

The invention claimed is:

1. A bus bar which electrically connects a plurality of battery cells forming a battery module via a cathode and an anode terminals of the battery cells, the bus bar comprising:
   a conductive plate-shaped member; and
   two conductive concave portions, spaced from each other by a distance between adjacent ones of the terminals of adjacent ones of the battery cells, and provided inside the plate-shaped member, each of the concave portions including (i) a conductive bottom portion which includes a hole portion fitted with a corresponding one of the terminals and which is welded to the corresponding one of the terminals, and (ii) a thinner peripheral wall which is integral with both the plate-shaped member and the bottom portion, which defines a diameter gradually decreasing from the plate-shaped member to the bottom portion and which is thinner than a thickness of the plate-shaped member so that the each of the concave portions is more elastic than the plate-shaped member, wherein the peripheral wall including a first end connected to a plate-shaped member and an outer diameter and an inner diameter of which gradually reduce, and a bottom portion formed on a second end of the peripheral wall and projecting from the plate-shaped member, and
   wherein each concave portion is formed integrally with the plate-shaped member.

2. The bus bar of claim 1, wherein the peripheral wall is formed in a tapered shape.

3. The bus bar of claim 2, wherein the peripheral wall is formed of a plurality of stepped portions which are coaxially disposed and have decreasing diameters.

4. The bus bar of claim 1, further comprising:
   an annular convex portion provided on a surface of the plate-shaped member and formed around the peripheral wall of each of the two concave portions, the annular concave portion being thicker than the peripheral wall.

5. The bus bar of claim 1, wherein at least one convex strip portion is provided in a direction of disposition of the two concave portions which are provided in the plate-shaped member.

6. A battery module comprising: a plurality of battery cells including cathode terminals and anode terminals; and
   a bus bar which electrically connects adjacent ones of the terminals of adjacent ones of the battery cells, the bus bar comprising:
      a conductive plate-shaped member; and
      two conductive concave portions, spaced from each other by a distance between the adjacent ones of the terminals of the adjacent ones of the battery cells, and provided inside the plate-shaped member, each of the concave portions including (i) a conductive bottom portion which includes a hole portion fitted with a corresponding one of the terminals and which is welded to the corresponding one of the terminals, and (ii) a thinner peripheral wall which is integral with both the plate-shaped member and the bottom portion, which defines a diameter gradually decreasing from the plate-shaped member to the bottom portion and which is thinner than the plate-shaped member so that the each of the concave portions is more elastic than the plate-shaped member, wherein the peripheral wall including a first end connected to a plate-shaped member and an outer diameter and an inner diameter of which gradually reduce, and a bottom portion formed on a second end of the peripheral wall and projecting from the plate-shaped member, and
   wherein each concave portion is formed integrally with the plate-shaped member.

\* \* \* \* \*